United States Patent Office 3,365,167
Patented Jan. 23, 1968

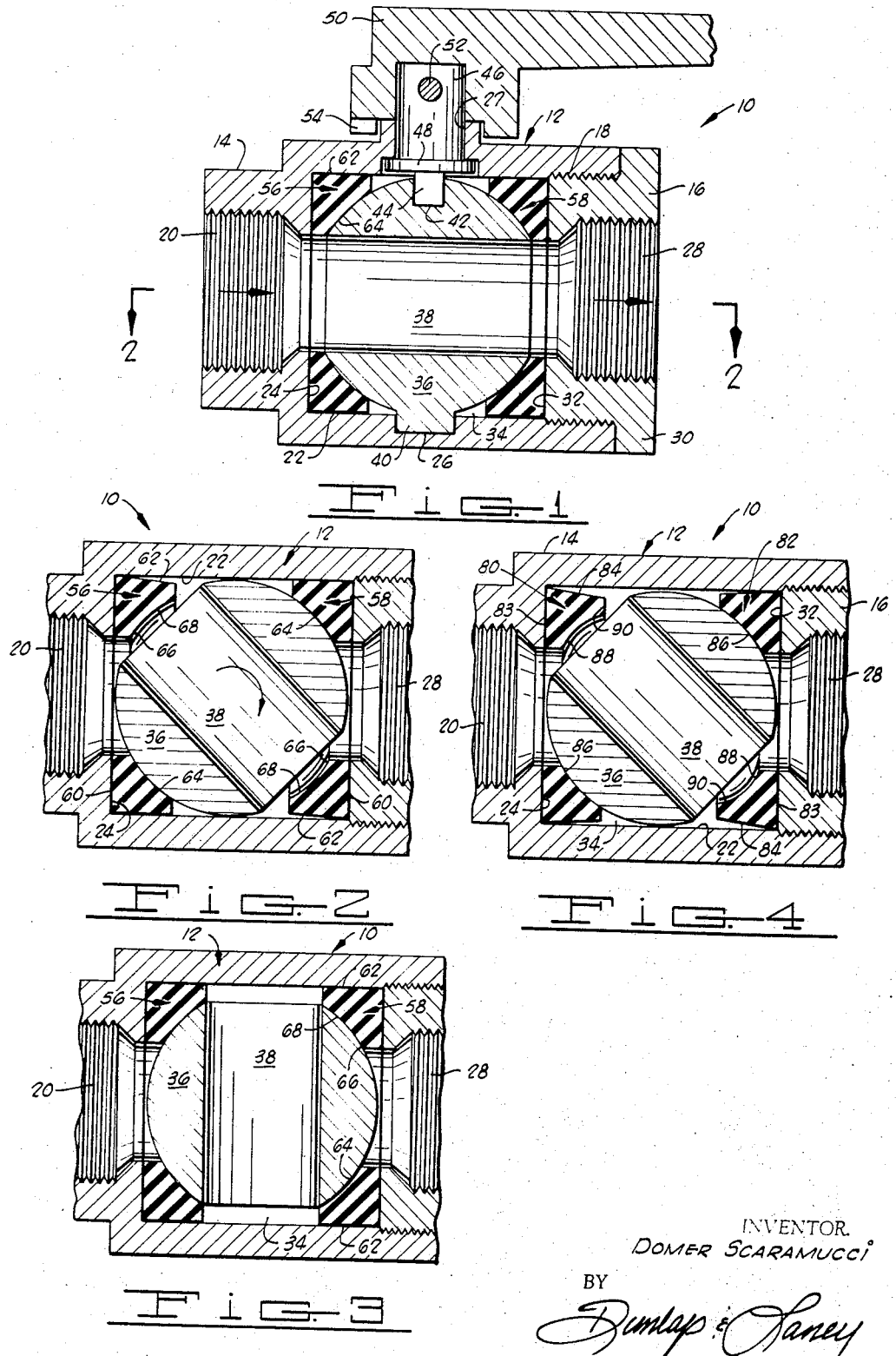
Jan. 23, 1968 — D. SCARAMUCCI — 3,365,167
LIP-LIKE VALVE SEALS
Filed Feb. 2, 1965 — 3 Sheets-Sheet 1
INVENTOR.
DOMER SCARAMUCCI
BY Dunlap & Laney
ATTORNEYS INVENTOR.
DOMER SCARAMUCCI
BY Dunlap & Laney
ATTORNEYS

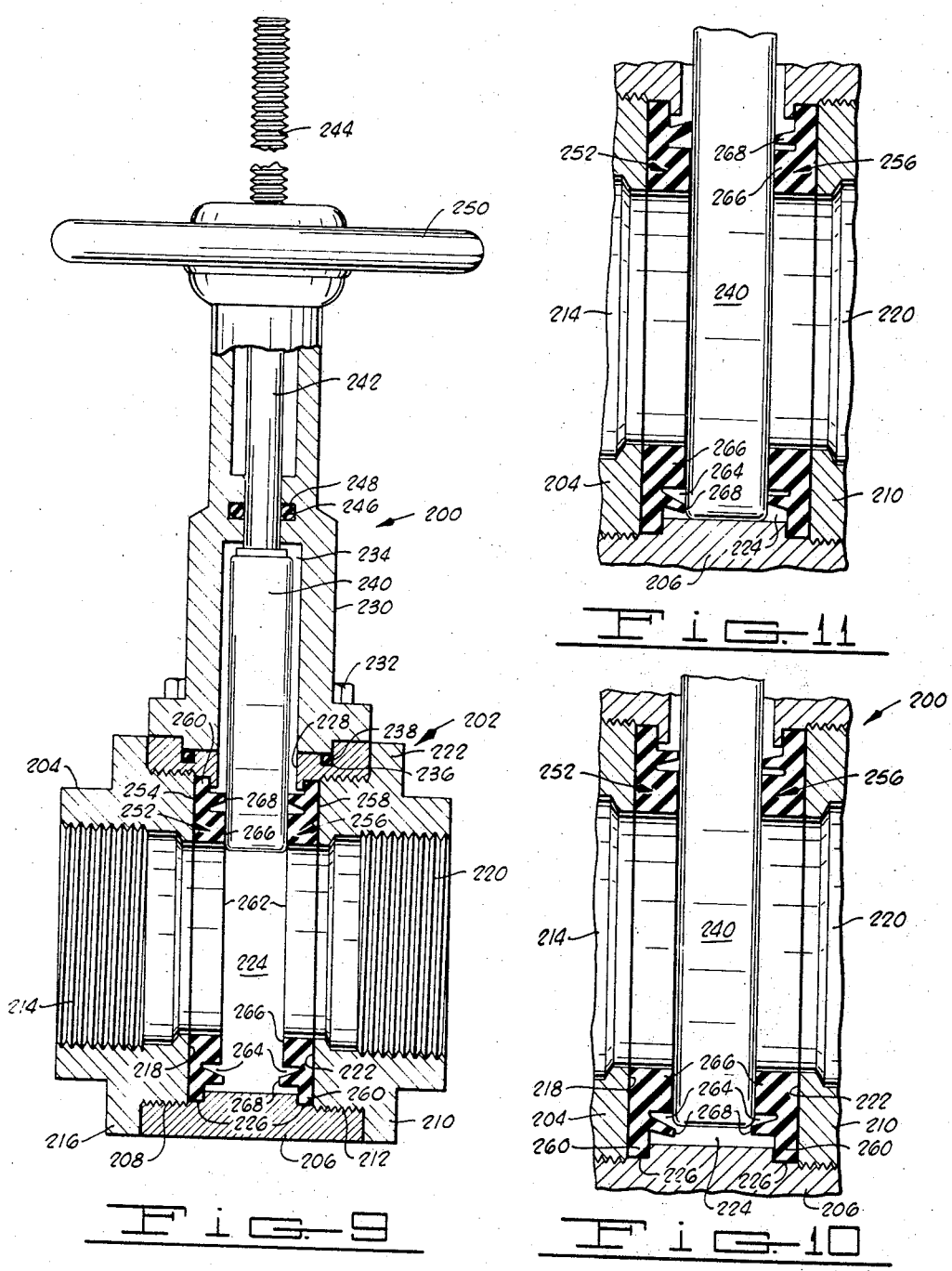

3,365,167
LIP-LIKE VALVE SEALS
Domer Scaramucci, 3245 S. Hattie,
Oklahoma City, Okla. 73129
Filed Feb. 2, 1965, Ser. No. 429,778
15 Claims. (Cl. 251—172)

ABSTRACT OF THE DISCLOSURE

A valve containing annular, resilient material seals around the inlet and the outlet providing seals between the valve member and valve body, wherein each seal has a relatively inflexible seat portion adjacent the inner periphery thereof engaging the valve member, and a flexible lip around the seat portion engaging the valve member to provide a low pressure seal and being responsive to pressure in the valve chamber to provide a high pressure seal.

This invention relates generally to improvements in valves useful in fluid circuits. More particularly, but not by way of limitation, this invention relates to an improved valve having novel seals therein.

For the most part, valves constructed in the past having resilient seals disposed between the valve body and movable valve member have been arranged so that the portion of the seal initially engaging the valve member will form a fluid-tight seal therewith. Such seals have generally included a portion, such as a bead or lip, thereon disposed adjacent the flow passageway through the valve and projecting from the seal toward the valve member so that the valve member and seal are in very tight sealing engagement.

It can be appreciated that, for instance in a plug or ball valve, the portion of the seal adjacent the flow passageway will tend to relax and move outwardly into the opening in the ball or plug valve member during rotation of the valve member. It can, therefore, also be appreciated that the edge of the opening will engage the seal resulting, more often than not, in damage to the seal or at least in a severe wear condition. It has been found that such seals generally have a relatively short service life when the valve is frequently opened and closed.

When the seals are constructed from a relatively soft material, they will be more flexible and less subject to damage during closure of the valve. However, softer seal materials cannot be used in valves that will be subjected to relatively high pressures due to their relatively poor load bearing characteristics.

When the seals are constructed from a relatively hard material that is resilient but less flexible than the soft seal materials, the engagement of the seal with the valve member results in the rapid wearing or destruction of the seal. However, the harder seal materials can be used with relatively high pressures due to their excellent load bearing characteristics. They have not proved satisfactory when the valve is to be used in relatively low pressure service due to their less flexible quality which results in the inability of the seal to conform to minor irregularities in the valve member.

In an effort to utilize the low pressure sealing characteristics of the softer seal materials in valves that will also be subjected to relatively high pressures, various forms of rigid reinforcing members, generally constructed from metal, have been combined with the softer seal materials. It should be pointed out that reinforced seals have not proved entirely satisfactory primarily due to their increased cost of manufacture.

Generally, this invention provides an improved valve that includes a valve body having a flow passageway extending therethrough, a valve member disposed in the valve and movable from a position wherein the flow passageway is open to a position wherein the flow passageway is closed, and a pair of resilient annular seals disposed in the valve body on each side of the valve member and in sealing engagement with the valve body. The seals are also in sealing engagement with the valve member when the valve member is in the position closing the flow passageway through the valve. More particularly, each of the novel seals includes a seat portion in engagement with the valve member and a seal portion that sealingly engages the valve member when the valve member is in the position closing the flow passageway.

One object of the invention is to provide an improved valve that has an extended service life.

Another object of the invention is to provide an improved valve incorporating seals therein that provide both a high pressure and low pressure fluid-tight seal.

Still another object of the invention is to provide an improved valve incorporating seals therein that have a seal portion sealingly engaging the valve member when the valve is in the closed position and wherein the seal portions are responsive to pressure in the valve to augment the sealing engagement between the seal portion and the valve member.

A further object of the invention is to provide an improved valve that incorporates seals therein that provide fluid-tight seals with the valve member and are so constructed that they will not be damaged during opening and closing of the valve.

One other object of the invention is to provide an improved seal for use in valve that has a seat portion adapted to be disposed adjacent the flow passageway in the valve and a seal portion remote from the flow passageway adapted to sealingly engage the valve member when the valve is closed.

A still further object of the invention is to provide an improved seal having a seat portion disposed adjacent the flow passageway in the valve and in engagement with the valve member and a seal portion adapted to sealingly engage the valve member when the valve is closed and wherein the seal portion is responsive to pressure in the valve to augment the sealing engagement between the seal portion and the valve member.

An additional object of the invention is to provide an improved seal that, when installed in a valve, will not be damaged during opening and closing of the valve, thereby extending the service life of the seal and valve.

The foregoing and additional objects and advantages of the invention will become more apparent as the following detailed description is read in conjunction with the accompanying drawings wherein like reference characters denote like parts in all views and wherein:

FIG. 1 is a vertical cross-sectional view of a ball valve constructed in accordance with the invention;

FIG. 2 is a horizontal cross-section of the valve of FIG. 1 taken substantially along the line 2—2 of FIG. 1, but showing the valve ball in a different operating position;

FIG. 3 is a view similar to FIG. 2, but showing the valve member in the closed position;

FIG. 4 is a view similar to FIG. 2, but showing another embodiment of seal also constructed in accordance with the invention;

FIG. 9 is a vertical cross-sectional view of a gate valve also constructed in accordance with the invention;

FIG. 10 is an enlarged view of a portion of the valve of FIG. 9 and showing the valve member in a different operating position; and, FIG. 11 is a view similar to FIG. 10, but showing the valve member in still another operating position.

EMBODIMENT OF FIG. 1

Figures 5, 6:
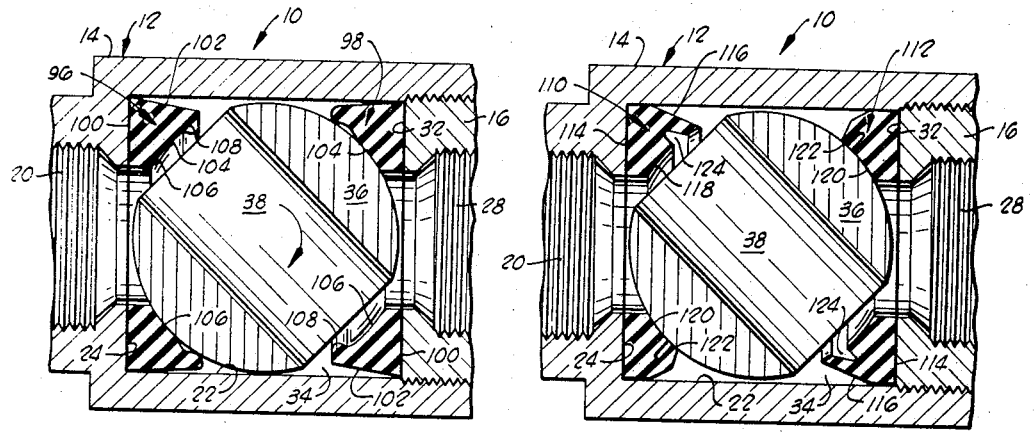
FIG. 5 is also a view similar to FIG. 2, but showing still another embodiment of seal also constructed in accordance with the invention.
FIG. 6 is a view similar to FIG. 2 and showing still another embodiment of seal also constructed in accordance with the invention.

Referring to the drawings, and to FIG. 1 in particular, shown therein and generally designated by the reference character 10 is a ball valve constructed in accordance with the invention. As illustrated, the ball valve 10 includes a valve body 12 having an inlet portion 14 and an outlet portion 16 threadedly connected by the mating threads 18.

The inlet portion 14 includes a partially threaded inlet 20 and a counterbore 22 forming a shoulder 24. The inlet portion 14 is also provided with a recess 26 formed in the counterbore 22 and an opening 27 extending through the upper side thereof for purposes that will become more apparent hereinafter.

The outlet portion 16 includes a partially threaded outlet 28 and an annular flange 30. The annular flange 30 abuts the end of the inlet portion 20 when the threads 18 are fully mated. When the inlet portion 14 and outlet portion 16 are assembled as illustrated, an end 32 of the outlet portion 16 cooperates with the counterbore 22 in the inlet portion 14 to form an enlarged chamber 34 in the valve body 12.

A valve ball 36 having an opening 38 extending therethrough is positioned in the chamber 34. The opening 38 in the valve ball 36 is adapted to be aligned with the inlet 20 and outlet 28 to provide a flow passageway through the valve 10. A lug 40 extends from the lower exterior surface of the ball 36 and is sized to be received in the recess 26 in the counterbore 22 of the inlet portion 14 to permit rotation of the valve ball 36 but to prevent the movement thereof parallel to the flow passageway extending through the valve 10.

The upper exterior of the ball 36 is provided with a recess 42 that is sized to receive a rectangular end 44 of a valve operating member 46. In addition to the rectangular end 44, the valve operating member 46 includes a peripheral flange 48 that engages the interior of the inlet portion 14 to limit the upward movement of the valve operating member 46 in the opening 27.

The upper end of the valve operating member 46 is connected with an operating handle 50 by a pin 52. The operating handle 50 includes a lug 54 that is adapted to engage an abutment (not shown) on the valve body 12 to limit the rotational movement of the handle 50 to approximately ninety (90°) degrees and, consequently, to limit the rotation of the valve ball 36 to approximately ninety (90°) degrees.

The valve 10 also includes a resilient annular upstream seal 56 and a resilient annular downstream seal 58. As can be seen in FIG. 1, the upstream seal 56 is disposed adjacent the inlet 20 and the downstream seal 58 is disposed adjacent the outlet 28. The seals 56 and 58 are identical in construction through oppositely disposed in the valve body 12. The seal 56 is shown in its relaxed position in the upper left hand portion of FIG. 2 and the seal 58 is shown in its relaxed position in the lower right hand portion of FIG. 2.

The upstream seal 56 includes a surface 60 in sealing engagement with the shoulder 24, a surface 62 disposed adjacent the interior of the counterbore 22, and a concave surface 64 to sealingly engage the valve ball 36. As shown in the relaxed position of the upstream seal 56, the surface 62 extends angularly with respect to the adjacent portion of the counterbore 22 relatively toward the flow passageway through the valve 10. As may be seen in the lower left hand portion of FIG. 2 and in FIG. 1, the surface 62 is moved into engagement with the counterbore 22 when the valve ball 36 fully engages the surface 64.

The concave surface 64 has a radius considerably smaller than the radius of the valve ball 36. It should be noted that the configuration of the surface 64 is such that the initial engagement of the valve ball 36 is made with a seat portion 66 on the surface 64 and results in only the very slight engagement of the upstream seal 56 with the valve ball 36. However, due to the difference in radii between the surface 64 and the valve ball 36, continued rotation of the valve ball 36 in the direction of the arrow in FIG. 2, results in the engagement of the valve ball 36 with a seal portion 68 on the upstream seal 56 wherein a much greater and fluid-tight engagement of the valve ball 36 with the seal 56 occurs. As previously mentioned, when the valve ball 36 has fully engaged the seal portion 68, the surface 62 on the seal 56 will be deformed into engagement with the valve body 12.

Also as previously mentioned, the downstream seal 58 is constructed identically to the upstream seal 56 and also includes the surfaces 60, 62 and 64 as described in detail in connection with the upstream seal 56. However, it should be noted that the surface 60 on the downstream seal 58 is in sealing engagement with the outlet portion 16 of the valve body 12.

Seals constructed in accordance with the preferred form of the invention are to be made from a resilient elastomer. The preferred elastomers are natural or synthetic rubbers having a hardness of from 80 to 90 durometer or a resilient synthetic resin such as nylon, Teflon or Delrin, if the valve is to be used in relatively high pressure service. If the valve is to be used only with relatively low pressures, the seals may be constructed from much softer resilient elastomers. It should be kept in mind as the following description is read that the various seal embodiments are constructed from the materials just described.

Operation of the embodiment of FIG. 1

As illustrated in FIG. 1, the valve 10 is shown in the fully opened position, that is, with the opening 38 in the valve ball 36 aligned with the inlet 20 and the outlet 28. With the valve ball 36 in the position illustrated, it can be seen that the upstream seal 56 and the downstream seal 58 are in sealing engagement therewith, thus preventing the entrance of fluid flowing through the valve 10 into the chamber 34.

As illustrated in FIG. 2, the valve ball has been rotated in a clockwise direction from the open position illustrated in FIG. 1 toward the closed position illustrated in FIG. 3. It will be noted in FIG. 2 that the portion of the upstream seal 56 and downstream seal 58 adjacent the opening 38 have relaxed since that portion of the seals is disengaged from the surface of the valve ball 36.

As the valve ball 36 is rotated, the surface thereof will engage the seat portion 66 of the upstream and downstream seals 56 and 58, respectively, forming the initial engagement therewith. Continued rotation of the valve ball 36 in the direction illustrated, moves the surface of the valve ball 36 into engagement with the seal portion 68 of the seals 56 and 58 deforming the seals outwardly until the surfaces 62 thereon engage the interior of the valve body 12. The engagement of the valve ball 36 with the seal portion 68, as previously described, forms an effective fluid-tight seal between the surface of the valve ball 36 and the seals 56 and 58.

If the pressure in the inlet 20 is relatively low, the seals formed will be effective to prevent the flow of fluid between the valve ball 36 and the upstream seal 56. However, if the pressure in the inlet 20 is relatively high, some fluid may flow between the upstream seal 56 and the valve ball 36 entering the passageway 38 and chamber 34. Fluid in the passageway 38 and chamber 34 engages the downstream seal 58 forcing the seal portion 68 of the downstream seal 58 into tighter engagement with the valve ball 36 and thereby augmenting the fluid-tight seal previously formed by the engagement of the valve ball 36 with the downstream seal 58. Even though the pressure in the inlet 20 is sufficiently high to flow between the upstream seal 56 and the valve ball 36, no fluid can flow through the valve 10 due to the fluid-tight downstream seal formed by the downstream seal 58 with the valve ball 36.

It should be pointed out that even when relatively soft seal material is used in constructing the seals 56 and 58, their configuration is such that the entire surface 64 of the downstream seal 58 will support the load exerted on the valve ball 36 by fluid pressure in the valve 10 due to the engagement of the surface 62 thereon with the interior of the valve body 12.

EMBODIMENT OF FIG. 4

FIG. 4 illustrates another embodiment of resilient annular seals also constructed in accordance with the invention and installed in the valve 10. In view of the identity of the various parts of valve 10, with the exception of the seals, the same reference characters will be used to designate the identical parts therein.

A resilient annular upstream seal 80 and an identical resilient annular downstream seal 82 are disposed in the chamber 34 of the valve body 12. The upstream seal 80 has a surface 83 thereon in sealing engagement with the shoulder 24 formed by the counterbore 22. As shown in the upper left hand portion of FIG. 4, the upstream seal 80 has a surface 84 that extends angularly with respect to the adjacent portion of the valve body 12 and relatively toward the flow passageway extending through the valve 10. By comparing FIGS. 2 and 4, it can be seen that the surface 84 is disposed at a considerably larger angle relative to the body 12 than the surface 62 of the upstream seal 56.

The upstream seal 80 also includes a concave surface 86 that is adapted to engage the surface of valve ball 36 as shown in the lower left hand portion of FIG. 4. The concave surface 86 has a radius that is considerably smaller than the radius of the valve ball 36.

As illustrated in the upper left hand portion of FIG. 4, the surface 86 includes a seat portion 88 that is arranged to lightly engage the valve ball 36 as it is rotated toward a closed position (not shown) and a seal surface 90 that, due to the configuration of the surface 86, tightly and sealingly engages the surface of the valve ball 36.

As previously mentioned, the downstream seal 82 is identical in construction to the upstream seal 80, though oppositely disposed in the chamber 34. The downstream seal 82 also includes the surface 83, but as can be seen clearly in FIG. 4, the surface 83 is disposed in engagement with the outlet portion 16 of the valve body 12 rather than in engagement with the shoulder 24 of the inlet portion 14. The downstream seal 82 also includes the angularly disposed surface 84 and the concave surface 86.

The surface 86 includes the seat portion 88 and the seal portion 90 as described in connection with the upstream seal 80. Seals 80 and 82 are preferably constructed from the materials mentioned in connection with the description of the seals 56 and 58.

The operation of the valve 10 with the seals 80 and 82 installed therein is substantially identical to the valve 10 with the seals 56 and 58 installed therein. However, it should be noted that the surface 84 does not move into engagement with the valve body 12 as was true in the embodiment of FIG. 1. Therefore, the seal portion 90 of the seals 80 and 82 will be somewhat more flexible and more responsive to pressure in the chamber 34. Also, the seal portion 90 of the upstream and downstream seals 80 and 82 is not a load bearing member, that is, the force of the valve ball 36 exerted on the downstream seal 82 in response to fluid pressure in the inlet 20 will be carried by the seat portion 88 of the seal 82.

EMBODIMENT OF FIG. 5

As illustrated in FIG. 5, the valve 10 is constructed precisely as in the embodiment of FIG. 1 with the exception of a resilient annular upstream seal 96 and a resilient annular downstream seal 98 which will be described in detail hereinafter. In view of the identity of various parts of valve 10, they will be designated by the same reference characters as used in the description of the embodiment of FIG. 1.

The upstream seal 96 is disposed in the chamber 34 and has a surface 100 in sealing engagement with the shoulder 24 formed by the counterbore 22 in the valve body 12. The upstream seal 96 also includes a surface 102 that is disposed at an angle relative to the adjacent portion of the body 12 and extends relatively toward the flow passageway in the valve 10.

As may be seen most clearly in the upper left hand portion of FIG. 5 wherein the seal 96 is shown in the relaxed position, there is provided a surface 104 on the seal 96 adapted to engage the exterior surface of the valve ball 36. The surface 104 includes a seat portion 106 that is formed on a radius substantially equal to the radius of the valve ball 36. The seat portion 106 is so disposed that it will be in light engagement with the surface of the valve ball 36 as illustrated in the lower left hand portion of FIG. 5. The surface 104 on the upstream seal 96 also includes a seal portion 108 that is formed as an annular bead extending around the surface 104 remote from the flow passageway through the valve 10. It should be noted that the seat portion 106 is disposed generally adjacent the flow passageway through the valve 10.

As previously mentioned, the downstream seal 98 is identical to the upstream seal 96 though oppositely disposed in the chamber 34. The downstream seal 98 has the surface 100 thereon in sealing engagement with the end 32 of the outlet portion 16 and the valve body 12. The downstream seal 98 is also provided with the surface 102 that extends angularly from the adjacent body portion relatively toward the flow passageway in the valve 10 and a surface 104 adapted to engage the exterior surface of the valve ball 36. The surface 104 of the downstream seal 98 also includes the seat portion 106 adjacent the flow passageway in the valve 10 and the seal portion or bead 108 that is located relatively remote from the flow passageway in the valve 10.

As the valve ball 36 is rotated in a clockwise direction, as illustrated by the arrow in FIG. 5, from an open position (not shown) toward a closed position (not shown), it can be appreciated that the surface of the valve ball 36 will lightly engage the seat portion 106 of the seals 96 and 98. As the rotation of the valve ball 36 continues, the surface thereon will engage the seal portion 108 deforming it relatively outwardly, moving the surface 102 toward the adjacent portion of the valve body 12 as illustrated on both the lower left-hand and upper right-hand portions of FIG. 5.

The engagement of the surface of the valve ball 36 with the seal portion 108 forms a fluid-tight seal therewith.

The light engagement of the valve ball 36 with the seat portion 106 may form a fluid-tight seal, but the seat portion 106 is intended primarily to support the load exerted by the valve ball 36 resulting from the pressure in the inlet 20.

If desired, the seals 96 and 98 can be sized so that the surfaces 102 thereon will come into engagement with the valve body 12 as described in connection with the seals 56 and 58 of FIG. 1. However, as illustrated in FIG. 5, the seals 96 and 98 are sized so that the surfaces 102 do not engage the valve body 12 (see the lower left-hand portion of FIG. 5), whereby the seal portions 108 function only to provide a fluid-tight seal and do not support any of the load exerted by the valve ball 36.

With the valve ball 36 in the fully closed position (not shown), the presence of a relatively low pressure in the inlet 20 may not be sufficient to deform the upstream seal 96 away from the valve ball 36. Thus, the seals 96 and 98 form both upstream and downstream fluid-tight seals with the valve ball 36.

However, if the pressure in the inlet 20 is relatively high, the pressure may deform the upstream seal 96 and flow into the chamber 34 and into the opening 38 of the valve ball 36. The pressure of fluid in the chamber 34 is exerted on the surface 102 of the downstream seal 98 forcing the seal portion 108 into tighter engagement with the valve ball 36, thus augmenting the down stream seal formed by the seal 98.

EMBODIMENT OF FIG. 6

As illustrated in FIG. 6, a resilient annular upstream seal 110 and a resilient annular downstream seal 112 are located in the valve 10. The valve 10 illustrated in FIG. 6 is identical to the valve 10 shown in FIG. 1, and the same reference characters will be used to designate the same parts therein.

The upstream seal 110 is disposed in the chamber 34 and has a surface 114 thereon in sealing engagement with the shoulder 24 formed in the valve body 12. A surface 116 extends angularly from the valve body 12 relatively toward the flow passageway extending through the valve 10. A surface 118 on the upstream seal 110 is divided into a seat portion 120 and a seal portion or lip 122 by an annular groove 124.

The seat portion 120 has a radius substantially equal to the radius of the exterior of the valve ball 36. The seal 110 is sized so that, as the valve ball 36 is moved toward the closed position (see FIG. 8), a light engagement occurs between the seat portion 120 and the valve ball 36.

The annular groove 124 is formed relatively deep so that the seal portion 122 is flexible even when the seal 110 is constructed from relatively hard material. The seal portion 122 projects slightly beyond the surface 118 so that the seal portion 122 tightly engages the valve ball 36 as illustrated in the lower left-hand portion of FIG. 6. The groove 124 not only increases the flexibility of the seal portion or lip 122, but also provides a space wherein foreign material that may be adhered to the exterior of the ball can be deposited as the ball is rotated, thereby avoiding damage to the seal portion 122 by the foreign material.

The downstream seal 112 is constructed identically to the upstream seal 110, but is oppositely disposed in the chamber 34. The surface 114 on the downstream seal 112 is in sealing engagement with the end 32 of the outlet portion 16.

As the valve ball 36 is rotated from a fully open position (not shown), that is, when the opening 38 is aligned with the inlet 20 and outlet 28, the seal portion 122 will be deformed into engagement with the valve ball 36 as illustrated in the lower left-hand portion and upper right-hand portion of FIG. 6.

Figures 7, 8:
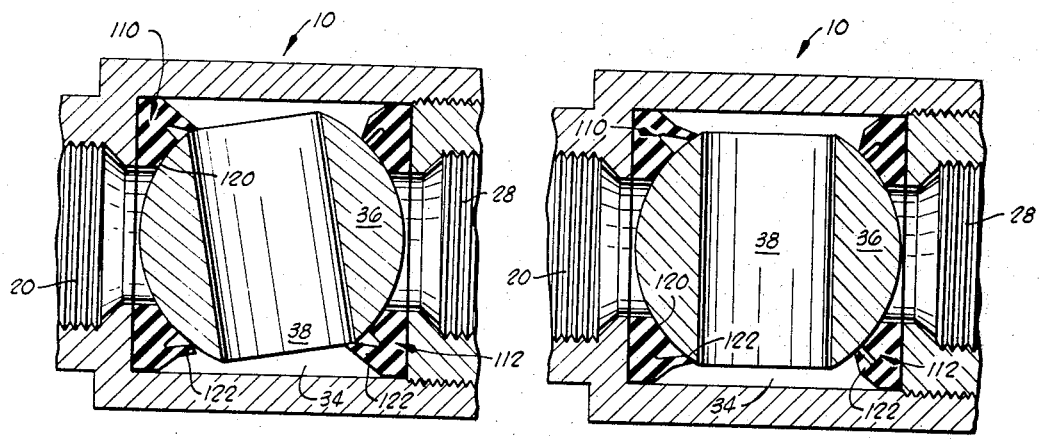
FIG. 7 is a view of the valve of FIG. 6, but showing the valve member in a different operating position.
FIG. 8 is a view of the valve of FIG. 6, but showing the valve member in still another operating position.

As the valve ball 36 nears the closed position of the valve 10, as illustrated in FIG. 7, fluid pressure in the inlet 20, if sufficiently high, may by-pass the seat portion 120 of the upstream seal 110 deforming the flexible seal portion 122, permitting the flow of fluid from the inlet 20 into the chamber 34. The fluid pressure in the chamber 34 will be exerted on the flexible seal portion 122 of the downstream seal seal 112.

As shown in the lower right-hand portion of FIG. 7, the seal portion 122 of the downstream seal 112 extends into the opening 38 of the valve ball 36, but it is important to note that the seal portion 122 will not be damaged due to its flexibility. The surface of the valve ball 36 merely cams the seal portion 122 outwardly.

Once the valve ball 36 has reached the closed position as shown in FIG. 8, fluid pressure in the chamber 34 is exerted on the flexible seal portion 122 of the downstream seal 112 deforming the seal portion 122 into tighter engagement with the valve ball 36 augmenting the fluid-tight seal formed between the seal portion 122 and the valve ball 36. If the pressure in the inlet 20 is relatively low, the seat portion 120 and seal portion 122 of the upstream seal 110 form a fluid-tight seal with the valve ball 36, whereby both upstream and downstream seals are formed in the valve 10. If the pressure in the inlet 20 is relatively high, fluid may flow between the valve ball 36 and the seat portion 120 deforming the seal portion 122 of the upstream seal 110 outwardly as shown in FIG. 8. When the fluid flows by the upstream seal 110, the downstream seal will be effective to form a fluid-tight seal with the valve ball 36 as previously described to prevent the flow of fluid through the valve 10.

The foregoing detailed description has been limited to the structure of a ball valve that is fixed against movement in the valve 10 parallel to the flow passageway extending therethrough. It will be well understood by those skilled in the art that the invention as previously described is also applicable to ball valves wherein the valve member is free to move parallel to the flow passageway extending through the valve. Also, it will be well understood by those skilled in the art that the invention as described herein is also applicable to valves having a generally cylindrical valve member. Naturally, the cylindrical valve member may be either fixed against movement parallel to the flow passageway through the valve or may be movable therein.

EMBODIMENT OF FIG. 9

FIG. 9 illustrates a gate valve generally designated by the reference character 200 and also constructed in accordance with the invention. The gate valve 200 includes a valve body 202 having an inlet portion 204 connected with a medial portion 206 by threads 208 and an outlet portion 210 connected with the medial portion 206 by threads 212.

The inlet portion 204 includes a partially threaded inlet 214 and a peripheral flange 216 that engages one end of the medial portion 206 of the body 202 to position an end 218 of the inlet portion 214 therein. The outlet portion 210 is provided with a partially threaded outlet 220 and a peripheral flange 222 that is adapted to engage the other end of the medial portion 206 of the body 202 to position an end 222 of the outlet portion 210 therein. The inlet portion 204, medial portion 206, and outlet portion 210 cooperate to form a chamber 224 in the valve body 202.

The medial portion 206 includes a pair of spaced, annular recesses 226 disposed adjacent each of the end surfaces 218 and 222 of the inlet portion 204 and outlet portion 210, respectively. An opening 228 extends through the medial portion 206 for purposes which will become more apparent as the description proceeds. The inlet 214, outlet 220, and chamber 224 form a flow passage way through the valve 200.

A hollow extension member 230 is attached to the medial portion 206 by a plurality of fasteners 232. The extension member 230 has a hollow interior 234 aligned with the opening 228 in the medial portion 206. An O-ring seal 236 is disposed in a recess 238 formed in the medial portion 206 and is in sealing engagement with the memebr 230 and with the medial portion 206 to prevent the flow of fluid from the interior 234 of the extension member 230.

The interior 234 of the hollow extension member 230 and the opening 228 in the medial portion 206 are sized to receive a gate valve member 240 that is movably disposed therein. A valve operating member 242 has its lower end connected with the valve gate member 240 and has the upper end thereof threaded as illustrated at 244. An O-ring seal 246 is disposed in a recess 248 formed in the hollow extension member 230 and is in sealing engagement with the extension member 230 and the valve operating member 242 to prevent the flow of fluid through the interior 234 of the extension member 230.

An operating handle 250 is rotatably positioned adjacent the upper end of the extension membr 230 and is threadedly connected with the threads 244 on the operating member 242. The arrangement is such that rotation of the handle 250 in one direction causes the valve operating member 242 and the valve gate member 240 to move upwardly in the chamber 224 into the hollow interior 234 of the extension member 230. Rotation of the operating handle 250 in the opposite direction moves the operating member 242 and the valve gate member 240 downwardly into the chamber 224 as will be described more fully hereinafter.

A resilient annular upstream seal 252 is disposed in the chamber 224 and has a surface 254 in sealing engagement with the end 218 of the inlet portion 204 of the valve body 202. Similarly, a resilient annular downstream seal 256 is disposed in the chamber 224 and has a surface 258 thereon disposed in sealing engagement with the end 222 of the outlet portion 210.

The seals 252 and 256 are identical in construction though oppositely disposed in the chamber 224 of the valve body 202. Each of the seals is provided with a peripheral flange portion 260 that is disposed in the recesses 226 of the medial portion 206 to retain the seals in the valve body 202. Also, each of the seals is provided with a surface 262 that is in engagement with the valve member 240 when the valve member 240 is in the closed position as illustrated in FIG. 11.

The surface 262 on each of the seals 252 and 256 is provided with an annular groove 264 that divides the surface into a seat portion 266 and a flexible seal portion 268. As may be seen most clearly in the lower portion of FIG. 10, the seal portion 268 projects slightly past the surface of the seat portion 266 so that it will be engaged by the end of the gate member 240 as it is moved toward the closed position of the valve 200.

As can be appreciated from viewing the FIGS. 9, 10, and 11, the groove 264 in the seals 252 and 256 is preferably formed relatively deep thereby rendering the seal portions 268 flexible even when constructed from relatively hard material. In the preferred construction of the seals 252 and 256, the seat portion 266 is sized to very lightly engage the valve gate member 240, whereby the seat portion 266 will support the load exerted on the gate member 240 by fluid pressure in the valve 200, but does not necessarily form a fluid-tight seal therewith.

The seals 252 and 256 are constructed from the materials described in connection with the seals 56 and 58 of the embodiment of FIG. 1. It should also be noted that the seat portion 266 is disposed relatively adjacent the flow passageway extending through the valve and that the seal portion 268 is disposed relatively remote from the flow passageway as was true with the previously described seals.

The valve 200 is illustrated in FIG. 9 in the full open position, that is, the gate member 240 has been raised to a position wherein its lower end is clear of the flow passageway extending through the valve 200. As the gate member 240 nears the closed position as shown in FIG. 10, the seat portions 266 of the upstream seal and downstream seal 252 and 256, respectively, are in engagement with the gate member 240.

If the fluid pressure in the inlet 214 is relatively low, the seat portions 266 may be effective to form both upstream and downstream seals preventing flow through the valve. However, if the fluid pressure in the inlet 214 is relatively high, fluid will flow between the seat portion 266 of the upstream seal 252 deforming the seal portion 268 of the upstream seal 252 away from the gate member 240 as illustrated in the lower portion of FIG. 10. When this occurs, fluid pressure exists in the chamber 224 and fluid continues to flow past the seal portion 268 and seat portion 266 of the downstream seal 256. It should be noted that the lower end of the gate member 240 merely deforms the seal portions 268 of the seals 252 and 256 outwardly due to flexibility of the seal portions, thereby avoiding any possibility of damage to the seal portions 268 as the gate member 240 moves toward the closed position.

When the gate member 240 reaches a fully closed position as illustrated in FIG. 11, fluid pressure in the inlet 214 (assuming that such pressure is relatively high) bypasses the seat portion 266 of the upstream seal 252 deforming the seal portion 268 relatively outwardly and permitting the entrance of fluid into the chamber 224. With fluid pressure in the chamber 224 the seal portion 268 of the downstream seal 258 is deformed into tighter sealing engagement with the gate member 240 to augment the fluid-tight seal formed therebetween by the engagement of the seal portion 268 with the gate member 240.

If the pressure in the inlet 214 is relatively low, the seal portion 268 and the seat portion 266 of the upstream seal 252 will be effective to form an upstream seal with the gate member 240. Thus, it can be seen that an upstream and downstream seal or, at least a downstream seal, is formed in the valve 200.

From the foregoing detailed descriptions of the various embodiments of the invention, it can be seen that the valves constructed in accordance with the invention and having the seals therein constructed from a relatively soft material will be effective when used in relatively low pressure service to form both upstream and downstream seals. Should the pressure in the valve be sufficiently high to overcome the structural strength of the upstream seal, an effective downstream seal will still be formed. When the seals are constructed from relatively hard material, it can be seen that the valves will be effective to obtain a fluid-tight closure of the valve at either relatively low or relatively high pressures due to a flexibility and pressure responsiveness of the seal portion of the various seal structures described hereinbefore.

It should be realized that the embodiments presented herein are by way of example only and that many modifications and changes can be made thereto without departing from the spirit of the invention or the scope of the annexed claims.

What I claim is:
1. A valve, comprising:
a body having an inlet, an outlet, and a chamber connecting the inlet and outlet to form a flow passageway through the body;
a valve member disposed in said chamber and movable from a position opening said passageway to a position closing said passageway; and
an annular seal of resilient material in said chamber around said outlet between the valve member and the body and sealingly secured to the body, said seal having
an annular, relatively inflexible seat portion adjacent the inner periphery of the seal positioned to engage the valve member as the valve member is moved to open and closed positions, and a flexible lip extending concentrically around the seat portion positioned to sealingly engage the valve member when the valve member is in a closed position and being responsive to fluid pressure in said chamber to be pressed tighter against said valve member, said lip and seat portion being separated by an annular groove to accommodate the movement of the lip when the lip is subjected to pressure in said chamber.

2. A valve comprising:

a valve body having an inlet, an outlet, and a chamber connected with said inlet and outlet to form a flow passageway through said body;

a valve member disposed in said chamber and movable from a position opening said passageway to a position closing said passageway; and a pair of resilient annular seals in said chamber in sealing engagement with said valve body and with said valve member when said valve member is in the position closing said flow passageway, one of said seals being adjacent said inlet and the other seal being adjacent said outlet, each of said seals having a relatively inflexible, an annular seat portion disposed adjacent said passageway in engagement with said valve member, and an annular, flexible lip radially outward of the seat portion positioned to sealingly engage said valve member, said lip being responsive to pressure in said valve to augment the sealing engagement between said lip and valve member, said lip and seat portion being separated by an annular groove to accommodate the movement of the lip when the lip is subjected to pressure in said chamber.

3. The valve of claim 2 wherein each of said seals has a peripheral surface adjacent said valve body remote from said flow passageway, said surface extending angularly with respect to the adjacent portion of said valve body and relatively toward said flow passageway.

4. The valve of claim 3 wherein said seals are constructed from an elastomer.

5. The valve of claim 4 wherein said elastomer has a hardness of from 80 to 90 durometer.

6. The valve of claim 3 wherein said seals are constructed from a resilient synthetic resin.

7. A valve comprising:

a valve body having an inlet, an outlet and a chamber connected with said inlet and outlet;

a valve member disposed in said chamber and having an opening extending therethrough, said valve member being rotatable from an open position wherein said opening is aligned with said inlet and outlet to form a flow passageway through said body to a position closing said flow passageway; and, a pair of annular resilient seals disposed in said chamber in sealing engagement with said valve body and valve member, one of said seals being disposed adjacent said inlet and the other seal being disposed adjacent said outlet, each of said seals having a relatively inflexible seat portion disposed adjacent said flow passageway and in engagement with said valve member, a flexible lip thereon remote from said passageway and in sealing engagement with said valve member, said lip being responsive to pressure in said valve to augment the sealing engagement between said lip and valve member, said lip and seat portion being separated by an annular groove to accommodate the movement of the lip when the lip is subjected to pressure in said chamber.

8. The valve of claim 7 wherein said lip projects beyond the surface of said seat portion into engagement with said valve member.

9. The valve of claim 8 wherein said lip has a surface adjacent said valve body, said surface extending angularly from said adjacent body portion relatively toward said flow passageway.

10. A valve, comprising:

a valve body having an inlet, an outlet, and a chamber connected with said inlet and outlet;

a valve member disposed in said chamber and having an opening extending therethrough, said valve member being rotatable from an open position wherein said opening is aligned with said inlet and outlet to form a flow passageway through said valve to a position closing said flow passageway; and, a pair of annular seals constructed from a resilient synthetic resin disposed in said chamber, one of said seals being disposed adjacent said inlet and the other seal being disposed adjacent said outlet, each of said seals having a surface in sealing engagement with said valve body, a relatively inflexible seat portion adjacent said flow passageway in engagement with said valve member, a flexible lip sealingly engaging said valve member, said lip being responsive to pressure in said valve to augment the sealing engagement between said lip and valve member, and an annular groove between said seat and lip to increase the flexibility and pressure responsiveness of said lip.

11. A gate valve comprising:

a valve body having an inlet, an outlet, and an elongated chamber connected with said inlet and outlet to form a flow passageway through said valve;

a valve gate disposed in said chamber and movable therein from a position closing said flow passageway to a position wherein said flow passageway is open; and, a pair of resilient annular seals disposed in said chamber in sealing engagement with said valve body, one of said seals being disposed adjacent said inlet and the other seal being disposed adjacent said outlet, each of said seals having a relatively inflexible seat portion disposed adjacent said flow passageway and in engagement with said valve gate when said valve gate is in the position closing said flow passageway, and a flexible lip remote from said passageway in sealing engagement with said valve gate when said valve gate is in the position closing said flow passageway, said lip being responsive to fluid pressure in said valve augment the sealing engagement of said lip with said valve gate, said lip and seat portion being separated by an annular groove to accommodate the movement of the lip when the lip is subjected to pressure in said chamber.

12. The valve of claim 11 wherein said seals are constructed from a resilient synthetic resin.

13. An annular-shaped, resilient seal for use in valves having a valve body, a flow passageway extending therethrough, and a valve member disposed therein for opening and closing the valve, said seal comprising:

a relatively inflexible seat portion adapted to be disposed adjacent the flow passageway in sealing engagement with said valve body and in engagement with said valve member when the flow passageway is closed; and, a lip radially outward of the seat portion adapted to sealingly engage the valve member when the flow passageway is closed, said lip being relatively flexible and adapted to be responsive to fluid pressure in the valve to augment the sealing engagement of said lip with the valve member, said lip and seat portion being separated by an annular groove to accommodate the movement of the lip when the lip is subjected to pressure in said chamber.

14. The seal of claim 13 wherein said seal is constructed from an elastomer having a hardness of between 80 and 90 durometer.

15. The seal of claim 13 wherein said seal is constructed from a resilient synthetic resin.

References Cited

UNITED STATES PATENTS

| | | | |
|---|---|---|---|
| 2,297,161 | 9/1942 | Newton | 251—315 |
| 2,636,713 | 4/1953 | Hamer | 251—328 X |
| 2,768,643 | 10/1956 | Acomb | 137—505.42 |
| 2,858,098 | 10/1958 | Sanctuary | 251—317 X |
| 2,945,666 | 7/1960 | Freeman | 251—172 |
| 2,989,990 | 6/1961 | Bass | 251—172 X |
| 3,096,965 | 7/1963 | Margus | 251—315 X |
| 3,210,042 | 10/1965 | Freeman | 251—315 X |
| 3,231,235 | 1/1966 | Anderson | 251—315 X |
| 3,235,224 | 2/1966 | Grove | 251—315 X |

WILLIAM F. O'DEA, *Primary Examiner.*

H. W. WEAKLEY, *Assistant Examiner.*